US012781713B2

(12) United States Patent
Nielsen et al.

(10) Patent No.: US 12,781,713 B2
(45) Date of Patent: *Nov. 3, 2026

(54) METHOD OF REPOWERING A WIND TURBINE

(71) Applicant: VESTAS WIND SYSTEMS A/S, Aarhus N (DK)

(72) Inventors: Thomas S. Bjertrup Nielsen, Skødstrup (DK); Jens Bredal Nielsen, Struer (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/878,599

(22) PCT Filed: Jun. 23, 2023

(86) PCT No.: PCT/DK2023/050163

§ 371 (c)(1),
(2) Date: Dec. 23, 2024

(87) PCT Pub. No.: WO2023/247000

PCT Pub. Date: Dec. 28, 2023

(65) Prior Publication Data

US 2025/0376972 A1 Dec. 11, 2025

(30) Foreign Application Priority Data

Jun. 23, 2022 (DK) ............................ PA202200608

(51) Int. Cl.

| | |
|---|---|
| ***F03D 80/50*** | (2016.01) |
| ***F03D 1/06*** | (2006.01) |
| ***F03D 13/10*** | (2016.01) |

(52) U.S. Cl.

CPC ......... *F03D 80/502* (2023.08); *F03D 1/0658* (2013.01); *F03D 13/104* (2023.08); *F05B 2230/80* (2013.01)

(58) Field of Classification Search

CPC . F03D 1/00; F03D 1/06; F03D 1/0677; F03D 1/0679; F03D 13/04; F05B 2230/80; Y02E 10/72; Y02E 10/727; Y02E 10/728

See application file for complete search history.

(56) References Cited

U.S. PATENT DOCUMENTS 7,517,194 B2 * 4/2009 Doorenspleet ........ F03D 1/0658 416/239

8,997,350 B2 * 4/2015 Trede ...................... F03D 80/50 212/179

(Continued)

FOREIGN PATENT DOCUMENTS

CN 102536683 A 7/2012

CN 102562485 A 7/2012

(Continued)

OTHER PUBLICATIONS

Print-out of https://www.rwe.com/en/press/rwe-renewables/2021-04-26-rwe-us-onshore-wind-farm-panther-creek-III-undergoes-repower/ (Year: 2021).*

(Continued)

*Primary Examiner* — Christopher R Legendre

(74) *Attorney, Agent, or Firm* — Patterson + Sheridan, LLP; Gero G. McClellan

(57) ABSTRACT

A method of repowering a horizontal-axis wind turbine comprising a tower, a nacelle located rotatably at the apex of the tower, and a rotor having a hub and at least three used blades mounted pitchably to the hub and extending radially therefrom is provided. The method includes the following steps: uninstall the at least three used blades from the hub, install at least three repower blades to the hub, each repower (Continued)

blade extending between a root and a tip, and each repower blade further comprising a connection point located between the root and the tip, install a plurality of blade connecting members, each blade connecting member being connected between corresponding connection points of a pair of repower blades; and install a tensioning system with the hub, the tensioning system being configured to adjust a tension in each blade connecting member.

11 Claims, 3 Drawing Sheets

(56) References Cited

U.S. PATENT DOCUMENTS

| | | | | |
|---|---|---|---|---|
| 10,927,809 | B2 * | 2/2021 | Barton | F03D 1/0675 |
| 12,011,771 | B2 * | 6/2024 | Koike | B23C 3/18 |
| 12,258,935 | B2 * | 3/2025 | Nielsen | F03D 1/0658 |
| 2012/0051912 | A1 | 3/2012 | Shi | |
| 2012/0051914 | A1 * | 3/2012 | Dehlsen | F03D 7/0228 416/147 |
| 2015/0233343 | A1 | 8/2015 | Versavel | |
| 2023/0400010 | A1 * | 12/2023 | Guntur | F03D 7/0224 |
| 2025/0314232 | A1 * | 10/2025 | Ravnsbæk-Toft | F03D 1/0669 |

FOREIGN PATENT DOCUMENTS

| | | | |
|---|---|---|---|
| CN | 105464900 | A | 4/2016 |
| CN | 105673326 | A | 6/2016 |
| EP | 3580453 | A1 | 12/2019 |
| WO | 2010046760 | A2 | 4/2010 |
| WO | 2023126041 | A1 | 7/2023 |

OTHER PUBLICATIONS

Danish Patent and Trademark Office, 1st Technical Examination including the Search Report and Search Opinion for Application PA 2022 00608 dated Dec. 21, 2022 (Dec. 21, 2022).

PCT International Search Report and Written Opinion of The International Searching Authority for Application PCT/DK2023/050163 dated Sep. 28, 2023 (Sep. 28, 2023).

Intention to grant Received for EP Application No. 23737886.4, mailed on Sep. 24, 2025, 8 pages.

* cited by examiner

METHOD OF REPOWERING A WIND TURBINE

TECHNICAL FIELD

The present invention relates generally to repowering of horizontal axis wind turbines and more particularly to a repowering where used blades are replaced by repower blades as well as methods of operating a repowered wind turbine.

BACKGROUND

Wind turbines that are already installed and in operation are typically designed based on design loads determined based on the specific blade type, rotor diameter and climate where the wind turbine is intended to operate. The wind turbine owner could increase AEP, and as such the yearly earnings, if the rotor diameter can be increased. Further a larger rotor diameter may result in increased power production at lower wind speeds where the price per kWh in some markets are higher which increase earnings. However, it is often not possible to increase the rotor diameter, or the increase is very limited of as a larger rotor is heavier resulting in increased loads for the load carrying components in the hub, nacelle and/or tower.

SUMMARY

It is an object of the invention to provide an improved method of repowering a wind turbine generator.

It is a further object of the invention to provide an improved method of operating the repowered wind turbine.

According to the first aspect, the invention provides a method of repowering a horizontal-axis wind turbine comprising a tower, a nacelle located rotatably at the apex of the tower, and a rotor. The rotor is having a hub and at least three used blades mounted pitchably to the hub and extending radially therefrom. The method comprises the steps of uninstall the at least three used blades from the hub and install at least three repower blades to the hub. This typically involves releasing and reinstalling the blades from the hub uptower, but particularly for rotors of smaller diameters, such as diameters below about 100 m, the rotor may be lowered to the ground before the blades are released and reinstalled from the hub.

Each repower blade extending between a root and a tip and comprises a connection point located between the root and the tip. Further, the method comprises to install a plurality of blade connecting members where each blade connecting member being connected between corresponding connection points of a pair of repower blades and install a tensioning system with the hub, where the tensioning system is configured to adjust a tension in each blade connecting member.

The connection point and connecting members are arranged so the blades may pitch in response to change in incoming wind. The connection points may be on the blade surface, inside the blade surface or on an extension of the blade to outside the blade surface. The blade connecting members may be a one-piece member or an assembly of two or more members, such as two extended pieces (such as cables) connected to a central frame optionally together with a tension member connecting the tensioning system to the blade connecting member.

The tensioning system being installed with the hub may for example be that the tensioning system is connected as a separate system onto the hub to thereby forming a collective repower hub also referred to simply as hub, but the tensioning system may also be built at least partially into the used hub.

In one example, the used blades are conventional wind turbine blades of the horizontal-axis wind turbine supported only at the blade root during use. In other words, conventional wind turbine blades are fundamentally different from repower blades used in the current invention, which repower blades are supported both via the blade root and via the blade connecting members. Conventional wind turbine blades do not have a connection point and hence connecting members as described in the present invention cannot be installed between a pair of conventional blades.

In one example the tensioning system may comprise a plurality of linear actuators, such as one linear actuator per blade, each linear actuator being coupled between the hub and a blade connecting member. The coupling between the hub and the blade connecting member is typically via the tensioning system and may be via a tension member.

In one example, the repower blade is installed to hub via a coning adjustment member arranged between the blade root and the hub. The coning adjustment member typically has two circular connections to respectively the pitch bolt connection circle and the blade root. The two circular connections are arranged at a slight angle, such as between 0.5 to 6° to allow for change in coning and/or sweep angle of the hub to blade connection. Wind turbines with the pitchable blade connecting member supported blades supports flapwise load reduction and the load reduction may be increased with increasing coning angle of the blades. Furthermore, increasing coning reduces the risk of tower hits. Unfortunately, it was found that increasing the coning angle also increased the pitch load during pitching and hence, if a coning adjustment member is arranged between the blade root and the hub as part of the repowering method, then it is preferred that the pitch system such as the pitch actuator and/or the blade bearing is reinforced or replaced during the repowering method.

In one example, the tensioning system is an independent unit attached near the front of the (used) hub. The tensioning system comprises a separate system for powering the linear actuators, such as a separate hydraulic system or a separate electrical system. In this way, no rearrangement or reconnections in the hub will be required and wind turbine down time for the repowering may be reduced. Yet, some strengthening of parts of the hub may be required to allow for the attachment of the independent tensioning unit to the hub, but such strengthening may typically be prepared without breaking and reconnecting electrical and/or hydraulic connections in the (used) hub.

In another example, the tensioning system comprises a system for powering the linear actuators which is integrated with a blade pitch system of the hub by a shared system for powering the linear actuators. Such integration may for example be by sharing (part of) a hydraulic system or (part of) an electrical system used for pitching.

In one example, the method may comprise deinstall the hub from nacelle, install the tensioning system with the hub away from the nacelle and install the hub with tensioning system to the nacelle. This may be a preferred method if the tensioning system is to some degree integrated into the hub, such as for example, hydraulic containers are installed in the hub, or a common electrical system or hydraulic pump is used for the pitch and the tensioning system.

In one example, other components of the used wind turbine are serviced or replaced during repowering of the wind turbine. For example, a component of the wind turbine that is replaced may be selected from a group of main bearing, a gearbox, a generator, a blade bearing, a pitch system component, a yaw system component, a main shaft, and a base frame. In some cases, replacement or strengthening of components may allow for higher production or rating of the wind turbine. For example, the main bearing may require strengthening, gearbox may be adjusted for different rotational speed or torque, the generator may be upgraded to increase power production.

The repower blades may be at least 15% longer than the used blades and preferably the repower blades may be at least 20% longer than the used blade. In some case—particularly when one or more other components of the wind turbine is reinforced, such as the pitch system—the repower blades may be at least 25% longer than the used blades and preferably the repower blades may be at least 30% longer than the used blade. It is preferred that the repower blades are at most 35% longer than the used blades and preferably the repower blades are at most 25% longer than the used blade.

In another aspect of the invention concerns a method of operating a wind turbine repowered according to another aspect of the invention. In one example, the maximum tip speed during operation of the wind turbine generator with used blades is the same as the maximum tip speed during operation of the wind turbine generator with the repower blades. The maximum rotational speed may be adjusted as follows:

$$\omega_{Max\ Repowered} = \omega_{Max\ Used}\frac{\text{Rotor diameter}_{Used}}{\text{Rotor diameter}_{Repowered}}$$

Where $\omega_{Max\ Repowered}$ is the maximum rotational speed and Rotor diameter is the diameter of the rotor, i.e. (2×R+hub diameter). This allows for reuse of the same generator and (optional) gearbox where the longer blade length allows for earlier reaching of the maximum power. This is particularly relevant where the used wind turbine is a medium wind or a high wind turbine positioned at a low or medium wind site. The earlier reaching of maximum power may here allow for more energy production particularly at lower wind speeds where the value of the energy may be higher.

In another example, the maximum hub angular rotation speed during operation of the wind turbine generator with used blades is the same as the maximum hub angular rotation speed during operation of the wind turbine generator with the repower blades. This case typically requires replacement/upgrading of generator (and optional gearbox) as higher maximum power is reached. Often the higher tip speed will lead to increased noise level and potentially higher wear on blades. However, a higher amount of energy may be produced. To ensure wear of the components of the repowered wind turbine is limited to an acceptable level, it is preferred that one or more components of the drive train are replaced during the repowering using this option. Typically, components of the drive train replace are one or more of gear, generator and/or converter.

In one example, the repowering method comprising the step of installing an updated control software adapted to control the linear actuators and thereby the tension in the blade connecting members. The adjustment of the tension may be substantially statically, e.g. infrequent or even once for an extended period of operation, or the adjustment may be frequent, or even dynamically with adjustment during every rotation or at least several times per hour of operation.

A further aspect of the invention concerns the use of a repower blade for repowering a horizontal-axis wind turbine comprising a tower, a nacelle located rotatably at the apex of the tower, and a rotor having a central hub adapted for receiving at least three used blades mounted pitchably to the hub. The repower blade extends between a root and a tip, and comprises a connection point, where the connection point being located between the root and the tip. The connection point is for connecting blade connecting members to the blade. In some examples, the connection point is preferably between 25% and 60% of the total blade length away from the blade root. In preferred examples, the connection point may be between 40% and 50% of the total blade length away from the blade root.

BRIEF DESCRIPTION OF THE DRAWINGS

Examples of the present invention will now be described by way of non-limiting example only, with reference to the accompanying figures, in which.

DETAILED DESCRIPTION

Figure 1:
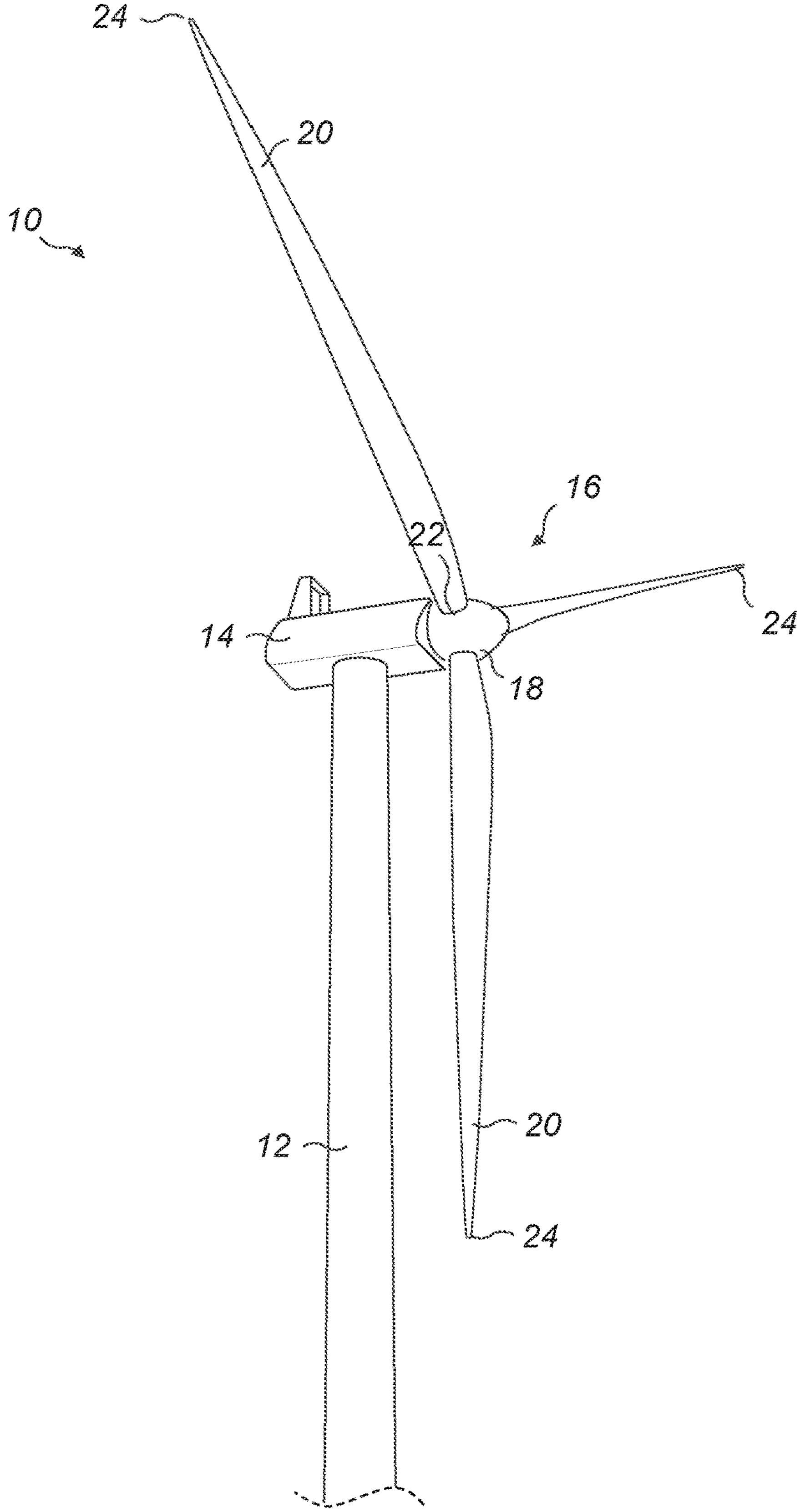
FIG. 1 is a schematic perspective view of a horizontal axis wind turbine comprising used blades.

FIG. 1 shows a horizontal-axis wind turbine 10 comprising a tower 12 and a nacelle 14 mounted rotatably on the tower 12. A rotor 16 with a hub 18 and used blades 20 connected pitchable to the hub 18. Each blade has a root 22 connected to the hub 18 and a tip 24 extending away from the hub 18.

Figure 2:
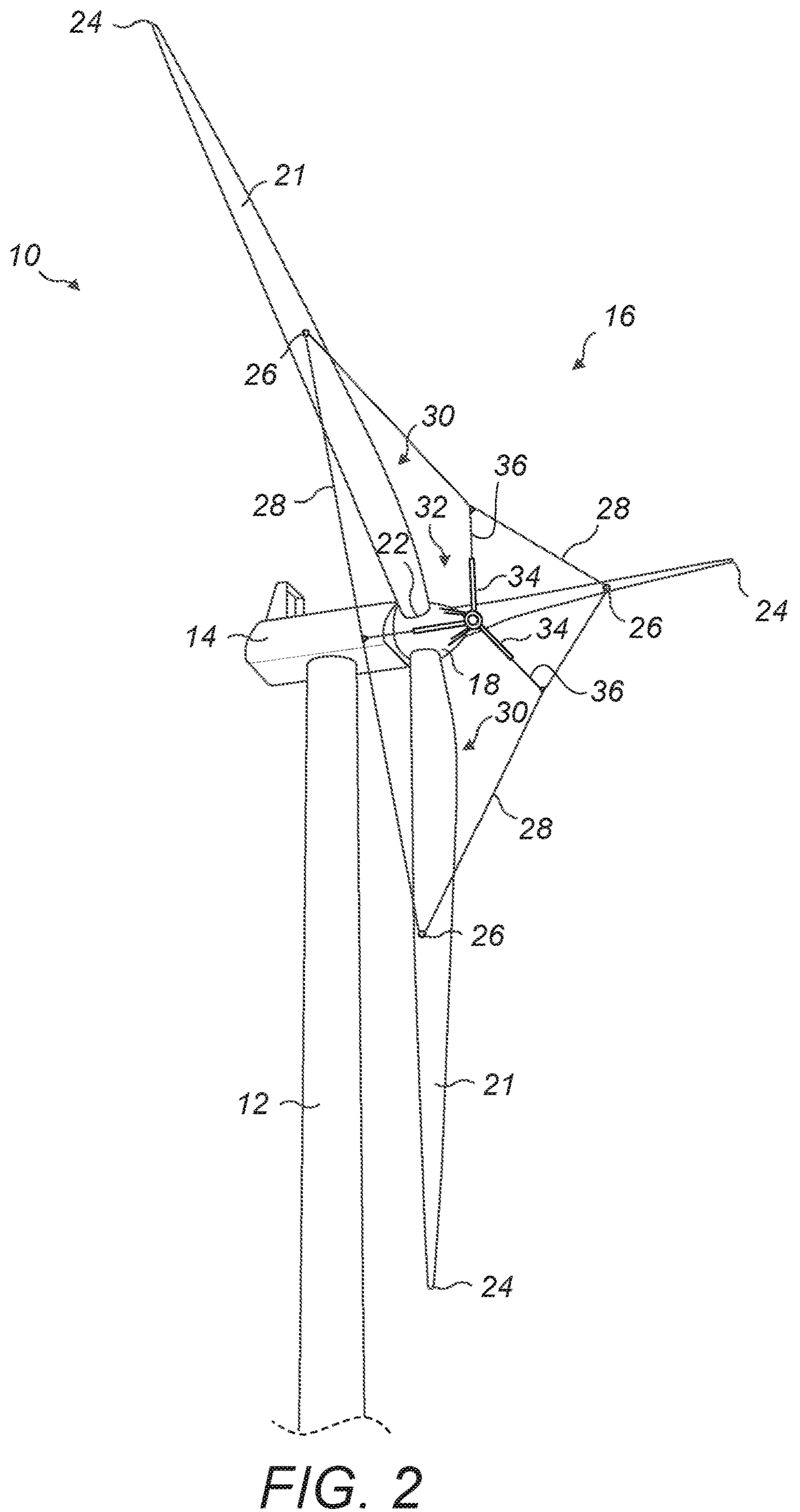
FIG. 2 is a schematic perspective view of a horizontal axis wind turbine comprising repower blades, blade connecting members and tensioning system.

FIG. 2 shows a horizontal-axis wind turbine 10 after replacement of the used blades 20 (see FIG. 1) with repower blades 21 and adding the further required components. Particularly, the wind turbine 10 of FIG. 2 comprises a tower 12 and a nacelle 14 mounted rotatably on the tower 12. A rotor 16 with a hub 18 and repower blades 21 connected pitchable to the hub 18. Each blade has a root 22 connected to the hub 18 and a tip 24 extending away from the hub 18. Furthermore, each blade 21 has a connection point 26 for receiving a blade connecting member 28. Preferably (as shown), the connecting point 26 may receive two blade connecting members 28—one for each neighbouring blade 21, but in some cases (not shown) the blade 21 comprises two connecting points 26 arranged with same or similar distance from the blade root 22 and each the connecting point may receive one blade connecting member 28 from one of the neighbouring blades 21.

The wind turbine also comprises a tensioning system 32 arrange with the hub 18, e.g. integrated with the hub 18 or arranged as an extension to the hub 18. The tensioning system 32 is adapted to adjust the tension in the blade connecting members 28 for example by pulling a part of the connection member toward the hub by linear actuators 34 optionally via a tension member 36.

Figure 3:
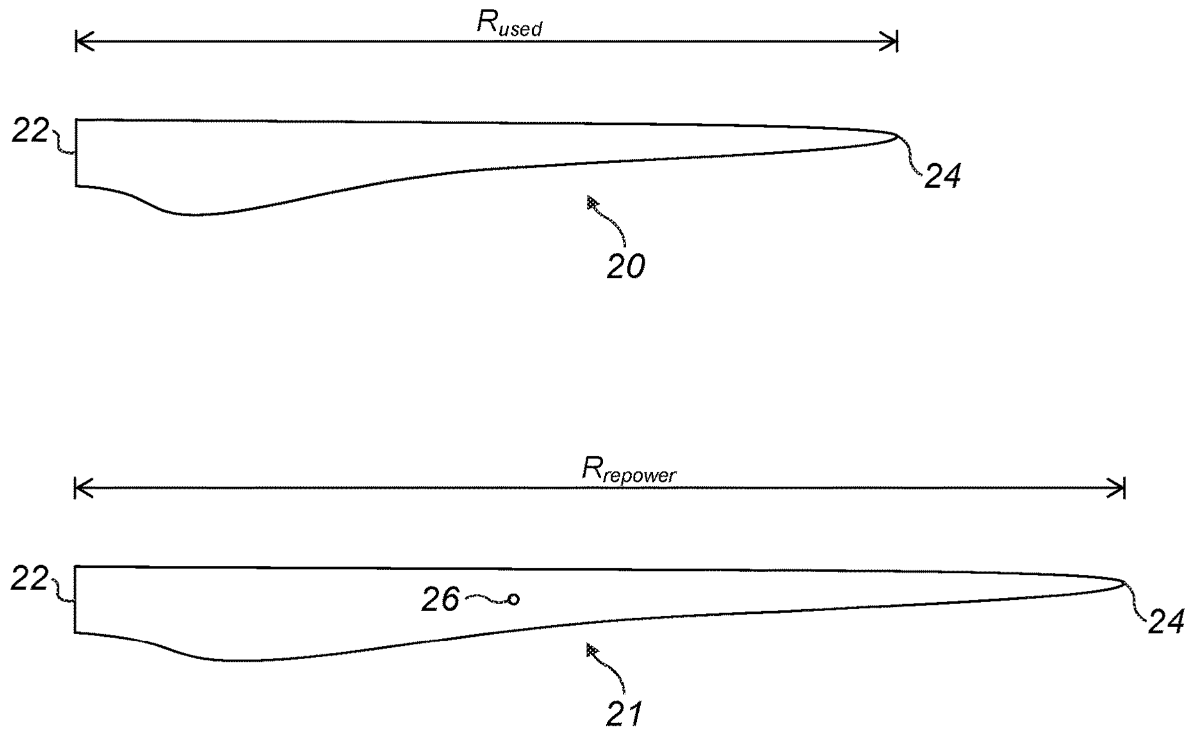
FIG. 3 schematically shows a used blade and a repower blade.

In FIG. 3, a comparison between the used blade 20 and the repower blade 21 is shown. The main differences being the length, where the length of the repower blade $R_{repower}$ is much longer that the length of the used blade $R_{used}$. Furthermore, the repower blade 21 comprises a connecting point 26 for receiving a blade connecting member 28.

Due to the advantages of the reinforcement of the repower blade 21 by the blade connecting members 28 during use both with respect to flapwise loads and edgewise loads the repower blade 21 has reduced strength requirement and hence may be more slim, more light weight and/or have a better aerodynamic profile particularly for section of the blade between the blade root and the connection point 26.

The repower blade 21 may be a split blade. Particularly, the repower blade may comprise a root part and a tip part connected with a blade connection element, which preferably comprises the connection point.

The invention claimed is:

1. A method of repowering a horizontal-axis wind turbine comprising a tower, a nacelle located rotatably at an apex of the tower, and a rotor having a hub and at least three used blades mounted pitchably to the hub and extending radially therefrom, the method comprising:

uninstalling the at least three used blades from the hub, installing at least three repower blades to the hub, each repower blade extending between a root and a tip, and each repower blade further comprising a connection point located between the root and the tip, installing a plurality of blade connecting members, each blade connecting member being connected between the corresponding connection points of a pair of the repower blades; and installing a tensioning system with the hub, the tensioning system being configured to adjust a tension in each blade connecting member, wherein the tensioning system comprises a plurality of linear actuators and a shared system for powering the plurality of linear actuators which is integrated with a blade pitch system of the hub.

2. The method according to claim 1, wherein the used blades are supported only at roots of the used blades.

3. The method according to claim 1, wherein each respective linear actuator of the plurality of linear actuators is coupled between the hub and a corresponding blade connecting member of the plurality of blade connecting members.

4. The method according to claim 1, wherein the tensioning system is attached near a front of the hub.

5. The method according to claim 1 further comprising:

deinstalling the hub from a main shaft of the wind turbine, installing the tensioning system with the hub away from the main shaft, and installing the hub with tensioning system to the main shaft.

6. The method according to claim 1 further comprising replacing a component of the wind turbine selected from a group consisting of main bearing, a gearbox, a generator, a blade bearing, a pitch system component, a yaw system component, a main shaft, and a base frame.

7. The method according to claim 1 wherein the repower blades are at least 20% longer than the used blades.

8. The method according to claim 1, further comprising operating the wind turbine with the at least three repower blades, wherein the maximum tip speed during operation of the wind turbine with the at least three repower blades is the same as the maximum tip speed during operation of the wind turbine with the at least three used blades.

9. The method according to claim 1, further comprising operating the wind turbine with the at least three repower blades, wherein the maximum hub angular rotation speed during operation of the wind turbine with the at least three repower blades is the same as the maximum hub angular rotation speed during operation of the wind turbine with the at least three used blades.

10. The method according to claim 1, wherein the method further comprises installing control software adapted to control the plurality of linear actuators.

11. A horizontal-axis wind turbine, comprising:

a tower;

a nacelle disposed rotatably at an apex of the tower; and a rotor having a central hub;

at least three repower blades mounted to the central hub and configured for repowering the wind turbine, each repower blade extending between a root and a tip and comprising a connection point located between the root and the tip;

a plurality of blade connecting members, each blade connecting member being connected between the corresponding connection points of a pair of the repower blades; and a tensioning system configured to adjust a tension in each blade connecting member, wherein the tensioning system comprises a plurality of linear actuators and a shared system for powering the plurality of linear actuators which is integrated with a blade pitch system of the central hub.

* * * * *